United States Patent
Verma et al.

(10) Patent No.: US 10,915,379 B1
(45) Date of Patent: Feb. 9, 2021

(54) PREDICTABLE DISTRIBUTION OF PROGRAM INSTRUCTIONS

(71) Applicant: Microsoft Technology Licensing, LLC, Redmond, WA (US)

(72) Inventors: Nidhi Verma, Redmond, WA (US); Ankur Jauhari, Bothell, WA (US); Min Shao, Bellevue, WA (US); Zohar Raz, Redmond, WA (US); Shobana Krishnamoorthy, Redmond, WA (US); Divyachapan S. Padur, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/931,504

(22) Filed: May 13, 2020

(51) Int. Cl.
 G06F 9/54  (2006.01)
 G06F 9/50  (2006.01)
(52) U.S. Cl.
 CPC ............ G06F 9/542 (2013.01); G06F 9/5011 (2013.01)
(58) Field of Classification Search
 CPC ........................ G06F 9/45512; H04L 29/08072
 USPC ........................... 719/320; 709/201, 202, 203
 See application file for complete search history.

(56) References Cited

U.S. PATENT DOCUMENTS

| | | | |
|---|---|---|---|
| 9,043,458 B2 | 5/2015 | Balaji et al. | |
| 10,169,090 B2* | 1/2019 | Wang ................... | H04L 45/021 |
| 10,331,689 B2* | 6/2019 | Sorrentino ............ | G06F 16/248 |
| 2013/0332587 A1* | 12/2013 | Maya ..................... | G06Q 10/10 709/223 |
| 2015/0304176 A1* | 10/2015 | Ting .................... | G06Q 30/0283 709/203 |
| 2016/0335686 A1 | 11/2016 | AthuluruTlrumala et al. | |

OTHER PUBLICATIONS

"Software Selection & Implementation Roadmaps", Retrieved from: https://web.archive.org/web/20190608150734/https:/ismguide.com/services/customer-centric-strategy-and-implementation-roadmaps/, Jun. 8, 2019, 7 Pages.

(Continued)

*Primary Examiner* — Andy Ho

(57) ABSTRACT

Issues may arise when customers that are highly engaged with application services do not receive reliable feature updates on a predictable schedule. For instance, releasing and updating features may burden cloud infrastructure and/or may not perform properly. Not only are unpredictable feature updates associated with inconsistent customer messaging and potential service disruptions, such unpredictable updates may cause a random end user experience and customer dissatisfaction with the product. The methods and systems address these issues by dynamically ranking tenants and distributing updates and releases to tenants with lower feature usage before distributing to tenants with higher feature usage. The ranking of the tenants may dynamically change based on current usage. In this way, higher ranked tenants receive access to new and updated features after additional regression testing. This quality-driven, phased release of features enables load level management of computing resources as well as a predictable feature experience for end users.

20 Claims, 11 Drawing Sheets

(56) References Cited

OTHER PUBLICATIONS

Dang-Nguyen, et al., "Usage Analytics: Research Directions to Discover Insights from Cloud-Based Applications", In Proceedings of the 7th International Conference on Smart Cities and Green ICT Systems, Mar. 16, 2018, pp. 254-261.

Fenech, Keith, "Taking a Customer-Centric Approach to Software Product Management", Retrieved from: https://www.revulytics.com/blog/taking-a-customer-centric-approach-to-software-product-management, Nov. 3, 2017, 4 Pages.

Kesavulu, et al., "A Usage-Based Data Extraction Framework for Cloud-Based Application", In Proceedings of the International Conference on Computer-Human Interaction Research and Applications, vol. 1, Oct. 31, 2017, 8 Pages.

Sauvola, et al., "Towards Customer-Centric Software Development: A Multiple-Case Study", In Proceedings of 41st Euromicro Conference on Software Engineering and Advanced Applications, Aug. 26, 2015, 10 Pages.

Siroky, Dalibor, "The Link Between Change Management and Release Management", Retrieved from: https://www.plutora.com/blog/the-link-between-change-management-and-release-management, Retrieved on Mar. 20, 2020, 3 Pages.

\* cited by examiner

| Rank 402 | Group ID 404 | Tenant ID 406 | Tenant Name 408 | Farm ID 410 | Server ID 412 |
|---|---|---|---|---|---|
| 1000 | 10 | 40 | Y Finance | 0100 | 0123 |
| 999 | 9 | 08 | A1-Industry | 0050 | 0100 |
| 998 | 9 | 62 | HealthTech | 0201 | 1995 |
| 997 | 9 | 03 | P School | 6500 | 6532 |
| 996 | 9 | 31 | CC College | 1673 | 5760 |
| ... | | | | | |
| 5 | 3 | 22 | Security-S | 0024 | 6762 |
| 4 | 3 | 04 | BusyOne | 4621 | 6207 |
| 3 | 2 | 55 | ExtraBiz | 0792 | 7546 |
| 2 | 2 | 24 | 247 Security | 4622 | 0150 |
| 1 | 1 | 50 | Critical-Research | 1343 | 2679 |

| Tenant ID 502 | Tenant Name 504 | Farm ID 506 | Server ID 508 | Priority 510 | MAU 512 | RPS 514 | In-Season 516 |
|---|---|---|---|---|---|---|---|
| 03 | P School | 6500 | 6532 | 2 | 110 | 180 | No |
| 04 | BusyOne | 4621 | 6207 | 4 | 2000 | 8000 | No |
| 08 | A1-Industry | 0050 | 0100 | 1 | 15 | 28 | No |
| 22 | Security-S | 0024 | 6762 | 3 | 20 | 65 | Yes |
| 24 | 247 Security | 4622 | 0150 | 10 | 225 | 300 | No |
| 31 | CC College | 1673 | 5760 | 1 | 1200 | 800 | Yes |
| 40 | Y Finance | 0100 | 0123 | 1 | 8 | 1 | No |
| 50 | Critical-Research | 1343 | 2679 | 10 | 3000 | 1000 | Yes |
| 55 | ExtraBiz | 0792 | 7546 | 6 | 16 | 4 | No |
| 62 | HealthTech | 0201 | 1995 | 2 | 120 | 10 | No |

| Parameter ID 522 | Weight Value 524 | Parameter Name 526 |
| --- | --- | --- |
| 1 | 10 | Tenant Service Priority Level |
| 2 | 1 | Monthly Active Users |
| 3 | 1 | Request Per Second |
| 4 | 2 | CPU Usage Rate |
| 5 | 6 | Support Escalation Rate |
| 6 | 5 | In-Season |
| 7 | 3 | Feature-specific Interests |

| Distribution ID 530 | Code ID 532 | Tenant Group ID 534 | Start Time 536 | Pause Duration 538 |
|---|---|---|---|---|
| 1 | 1 | 10 | 20200410, 0200 | 120 minutes |
| 2 | 1 | 9 | 20200411, 0300 | 240 minutes |
| 3 | 2 | 10 | 20200412, 0200 | 480 minutes |

PREDICTABLE DISTRIBUTION OF PROGRAM INSTRUCTIONS

BACKGROUND

Use of a cloud computing environment for software products and services has become popular for both consumers and enterprises. End users of an enterprises upload files, share files, and perform other operations, such as collaborate on tasks, by using application services on the cloud computing environment. The cloud computing environment involves a distributed set of resources, including memory, processing units, and data storage communicatively interconnected via a secured network. The distributed computing resources may be integrated both physically and virtually. Virtual integration of servers enables dynamic allocation of resources for tenants of the cloud computing environment. This way, the service provider enables tenants to seamlessly and dynamically scale up or scale down usage by continually assessing and reallocating resources among servers hosting the tenants. However, distribution of new and updated software features by the service provider also relies on cloud resources. Some tenants may be more sensitive than others to service interruptions associated with feature releases, particularly where the tenants are actively using the features, for example. For instance, service interruptions may involve the new or updated feature becoming unavailable or performing unpredictably for end users. Unpredictable activation or updating of features may cause randomness in the end user experience. Moreover, such inconsistent deployment may cause a mismatch in communications to customers regarding available features, e.g., via the customer administration portal. Unreliable communication with customers may lead to customer dissatisfaction. Thus, there is a need to minimize service interruptions and customer dissatisfaction, while also improving the customer experience, when distributing code associated with new and updated features in a cloud computing environment.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues are resolved by distributing program instructions associated with features to tenants based on a dynamic ranking of the respective tenants. "Tenants," or customers, of application services may be hosted by a software provider on physical or virtual servers in a cloud computing environment. A "feature" may be associated with an operation performed by the application services, such as uploading a file, creating a list, sharing a file, authenticating a request, creating a webpart, etc. Traditionally, feature rollout is composed of two parts: code "rollout" and code "light up." That is, the code associated with a feature is first deployed (rolled out) and then enabled (lighted up or turned ON). Additionally, features are enabled in stages, or click stops, for random sets of deployed code. For instance, a feature may be enabled for 1%, then 5%, then 10%, etc., of tenants. After each stage, the enabled features may be evaluated to ensure code stability and user satisfaction. As used herein, the term "distribute" or "distribution" of program instructions (or code) refers to enabling or turning ON the program instructions (or code) that have been deployed to tenants.

As should be appreciated, early stages of code distribution tend to be less stable until after completing feature evaluation and testing. In aspects, rather than distributing program instructions to tenants that are randomly selected, the present disclosure distributes the program instructions based on a dynamic ranking of the tenants, with the code being distributed to lower ranked tenants before higher ranked tenants that may be more sensitive to service interruptions (e.g., due to high feature usage). Thereby, the system and methods described herein address the issue of service interruptions and customer dissatisfaction associated with distribution of new and updated software features to tenants of a cloud computing environment.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIGS. 5A-5C illustrate examples of parameters for ranking the tenants in accordance with aspects of the present disclosure.

DETAILED DESCRIPTION

Figure 1:
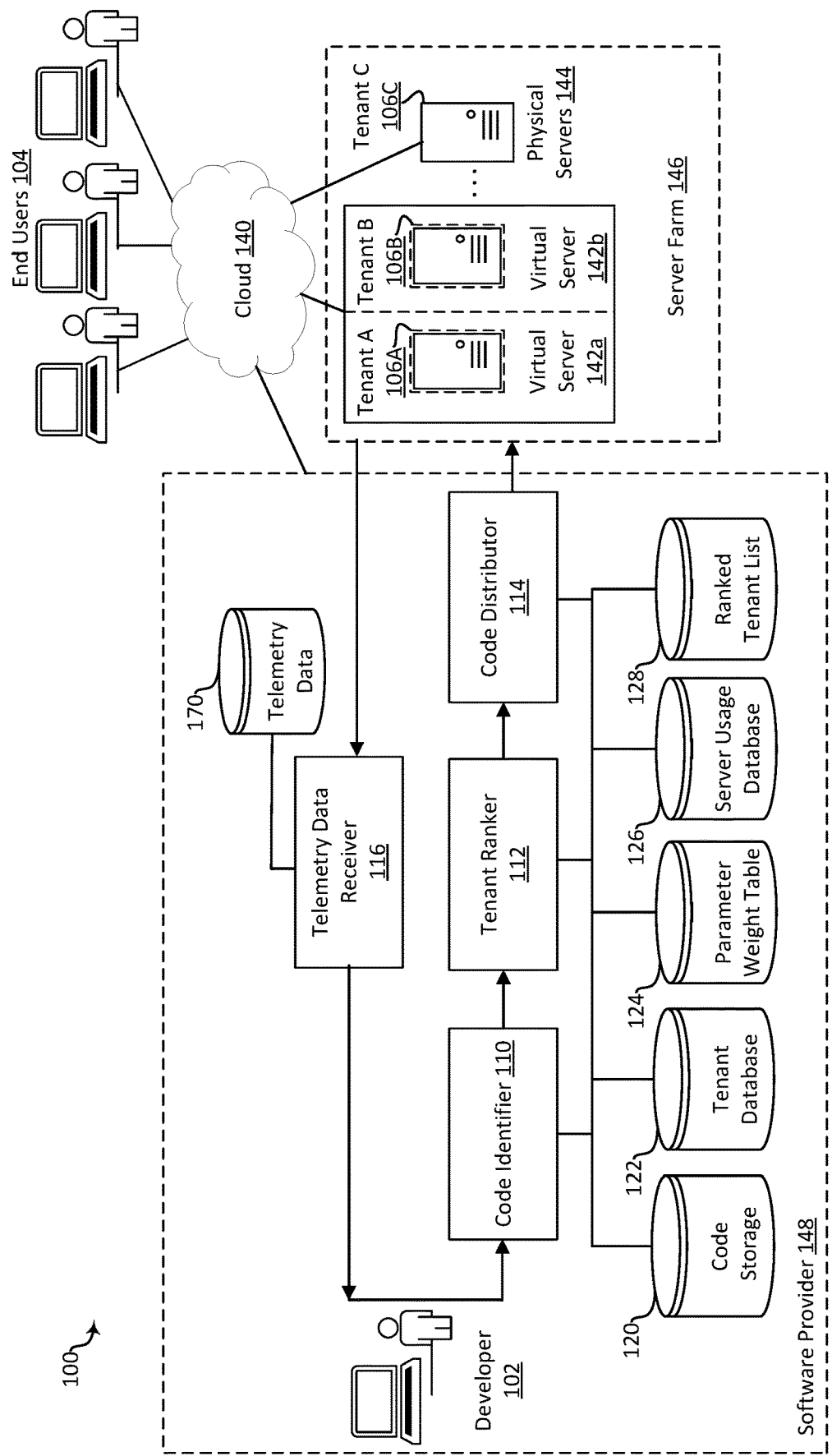
FIG. 1 illustrates an overview of an example system for distributing program instructions in accordance to aspects of the present disclosure.

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure relates to systems and methods for distributing program instructions to tenants of a cloud computing environment. Cloud computing environments are distributed systems, where application functionality, memory, data storage and retrieval, and various processing functions may be operated remotely from each other over a network, such as the Internet or a secure intranet. "Tenants," or customers, of application services may be hosted by a software provider on physical or virtual servers in the distributed system. Software program instructions (or code) for accessing the application services may then be distributed (or enabled) by the software provider to the server systems hosting the tenants. Indeed, cloud-based application services have become widely used and relied on as business productivity tools. In this way, business users associated with enterprise customers can collaborate online (store/share documents, access internal sites, lists/libraries, for example) from anywhere in the world. Users may access the services using a variety of devices, e.g., mobile phones, laptops and tablets. Application services are available for use 24 hours day, 365 days a year with minimal downtime for maintenance.

Generally, customers of application services have come to expect frequent updates that provide access to the latest new features and quickly distribute necessary fixes. Unlike standalone applications where program instructions reside on local computing devices of end users, features of the application service may be continually updated by distributing the program instructions (e.g., code) to tenants hosted by servers in the cloud. These servers may collectively provide the application services to millions of users, for example. However, issues may arise when the distribution of the program instructions burdens cloud infrastructure and/or the distributed code contains errors. These errors may suddenly interrupt the application services to a large number of users.

In aspects, new features and fixes may be continuously distributed to customers (e.g., tenants) using a code distribution and enablement process. However, the distributed features are generally not enabled for all tenants at the same time; rather, each feature is enabled in stages, or click stops, for random sets of distributed code. For instance, a feature may be enabled for 1%, then 5%, then 10%, etc. After each stage, the enabled features may be evaluated to ensure code stability and user satisfaction. In some aspects, target tenants may be randomly selected for early stages of enabling each feature. However, the random selection of tenants can lead to unpredictable feature activation for the tenants, causing customer dissatisfaction with the application services. This issue is compounded when the software provider distributes new features and fixes to millions of users on a near continuous basis.

The disclosure addresses the above issues by dynamically ranking tenants based on a variety of criteria, including tenant priority, tenant usage, feature type, and the like, to prevent service interruptions and customer dissatisfaction during distribution of feature releases and updates. In general, a "feature" may be associated with an operation, such as uploading a file, creating a list, sharing a file, authenticating a request, creating a webpart, etc. Thus, service disruptions associated with feature releases or updates may involve disruptions in an end user's ability to perform operations such as uploading or sharing files, etc. Such disruptions affect tenants that are actively using a particular feature (e.g., operation) more than tenants that are less active with the feature. Accordingly, the present methods and systems seek to distribute new and updated features to lower priority tenants with lower feature usage before higher priority tenants with higher feature usage. Moreover, depending on the particular feature being released or updated, the ranking of the tenants may change. That is, whereas one tenant may be ranked lower for one feature (e.g., file sharing), that tenant may be ranked higher for another feature (e.g., creating a webpart). Thus, lower ranked tenants are lower in service priority level and less active in using a particular feature of the application services than higher ranked tenants. A set of program instructions associated with the feature is distributed to the lower ranked tenants first. In this way, if there are any service disruptions, these lower ranked tenants with lower usage of the feature will not be significantly impacted, reducing customer dissatisfaction. After verifying that the new or updated feature is functioning properly, the set of program instructions is distributed to higher ranked tenants. This way, higher ranked tenants receive access to new and updated features after the program instructions have experienced additional regression testing.

FIG. 1 illustrates an overview of an example system for distributing program instructions in accordance with aspects of the present disclosure. System 100 may represent a system for distributing program instructions to one or more tenants of a cloud computing environment 140.

Developer 102 may develop program instructions executing a feature. A feature may be associated with an operation, such as uploading a file, creating a list, sharing a file, authenticating a request, creating a webpart, etc. Based on the operation performed, features may be of different feature types (e.g., upload type, share type, webpart type, etc.). In aspects, developer 102 may provide the program instructions to the program instructions storage or the code storage 120. After releasing a feature, a developer 102 may analyze telemetry data 170, which records how end users 104 interact with the feature. In some cases, developer 102 may update the program instructions associated with the feature in response to the analysis.

End users 104 may use computing devices to access software products and services offered by software provider 148 via cloud computing environment 140. For instance, each end user 104 may be associated with a tenant (e.g., tenant A 106*a*, tenant B 106*b*, and tenant C 106*c*) hosted by the software provider 148 on cloud computing environment 140. The cloud computing environment 140 contains at least one server farm 146. A server farm 146 may contain virtual servers 142*a/b* and physical servers 144. The server farm 146 provides application services, file sharing, workflow services, for example, to the end users 104. In aspects, there may be millions of end users 104 using various application services made available through the cloud computing environment 140.

Cloud computing environment 140 is a cloud of servers that are inter-connected. The servers collectively provide application services to end users 104. Additionally or alternatively, a set of servers form a server farm 146. The server farm 146 may include one or more application services. The server farm 146 may include virtual servers 142*a/b* and physical servers 144. The virtual servers 142*a/b* partitioned on one or more physical servers 144 may provide functionality (e.g., processing and memory) of a dedicated server to one or more tenants in a physical server. Tenant A 106A may use one virtual server 142a and tenant B 106B may use another virtual server 142b in a set of virtual servers 142a/b, for example.

Virtual servers 142a/b and physical servers 144 collectively form a server farm 146. Memory in the respective virtual servers 142a/b and physical servers 144 may store program instructions for execution by Central Processing Unit (CPU), not shown in the figure. Execution of the program instructions makes features (e.g., operations) available for use by end users 104. New program instructions (e.g., new code) may be distributed and installed to provide new features. Thus, server farm(s) 146 provide end users 104 access to software products and services administered by software provider 148, such as uploading files, sharing files, authenticating requests, creating webparts, etc. In aspects, millions of end users 104 associated with thousands of tenants may access various application services made available through cloud computing environment 140.

Code identifier 110 may identify a set of program instructions (e.g., code) associated with a feature for distribution to tenants. In aspects, the developer 102 registers the code for storing in the code storage 120. Additionally, the developer may identify a "type" of the feature. For instance, features may include "load type," "share type," "create type," "webpart type," etc. The developer 102 may also request a code distribution of the set of program instructions, which may encode a new feature or an update to a feature, for example. Thereafter, the developer 102 may request a code distribution (e.g., enablement or light up) of the set of program instructions. The code identifier 110 may assign a code ID to the set of program instructions. Accordingly, the code identifier 110 may identify the set of program instructions and the feature type based on the code ID.

In aspects, tenant ranker 112 assigns rankings to tenants hosted by a software provider 148. The ranking is based on parameter values associated with various parameters. The various parameters may relate to, but are not limited to, how tenants use the application services, how tenants use a particular feature being updated or released, and how sensitive respective tenants are to new or updated features associated with the application services. A tenant database 122 stores such tenant information. The tenant information includes a tenant identifier, a tenant name, a farm ID, a server ID, a service priority level of the tenant, and computing resources that are allocated to the tenant, for example. In aspects, the tenant information in the tenant database 122 may be relatively static information (e.g., static parameters), i.e., information that may only be updated occasionally (e.g., if the service contract between the tenant and the software provider 148 is updated).

Additionally, tenant ranker 112 assigns rankings to tenants based on more dynamic parameters that are updated (or change) more often. For instance, the server usage database 126 may store parameters that are indicative of how end users of respective tenants are using the application services. The types of dynamic parameters may include but are not limited to: (1) a number of monthly active users for each tenant, (2) a number of requests per second (or other period) made by the users of each tenant, (3) a peak usage time period for each tenant, (4) a CPU usage rate by each tenant, and (5) a number of end users with outstanding support inquiries for each tenant. In aspects, the system 100 dynamically updates parameter values of the parameters stored in the server usage database 126 over time (e.g., every day, every 5 days, every 15 days, etc.). This way, rankings assigned to tenants by the tenant ranker 112 may dynamically change based on changes to the values of dynamic parameters stored in server usage database 126.

As described herein, code identifier 110 specifies code (or program instructions) for distribution to tenants. In aspects, the code identifier 110 may also specify a feature type for a feature implemented based on executing the code. In aspects, code identifier 110 identifies code for distribution in the order of receiving an indication to distribute the code from a developer 102. In some aspects, the developer 102 may store the code in code storage 120. The code storage 120 may store the codes by indexing the codes based on the order that the codes are stored.

Tenant ranker 112 assigns rankings to tenants based on information including but not limited to: (1) feature information (e.g., feature type) associated with a set of program instructions stored in the code storage 120; (2) tenant information in a tenant database 122; (3) weighted values of parameters stored in a parameter weight table 124; and (4) server usage information by respective tenants from a server usage database 126. In aspects, tenant ranker 112 identifies a feature (and/or feature type) associated with the set of program instructions. The set of program instruction may introduce a new feature; alternatively, the set of the program instruction may update an existing feature by fixing malfunctions associated with the feature, enhancing or changing the feature, or removing the feature, for example. Based on the feature (and/or feature type) and properties of the tenant, the tenant ranker 112 may assign a higher rank to those tenants that use the feature (or feature type) more frequently and a lower rank to those tenants that use the feature (or feature type) less frequently. Distributing code to lower ranked tenants first protects higher ranked tenants that are more active using the application services. The phased distribution of code provides time to validate changes in code and rectify issues found during regression testing in early distributions. This way, the higher ranked tenants with more engaged use of the features receive distribution of more stable code.

In some aspects, tenant ranker 112 may apply various criteria for ranking tenants. The criteria (e.g., based on an algorithm) may involve comparing the tenants by ascribing values and weights for each of a set of parameters to each tenant. Then, based on the parameter values and weights, the tenant ranker 112 may rank each tenant on a continuum from low (or cold) to high (or hot). In aspects, the values for the parameters may be measured or assigned depending on the parameter. For instance, parameters may include but are not limited to: a service priority level for each tenant, a monthly average number of users for each tenant, a CPU usage rate for each tenant, and the like. The CPU rate or a CPU usage level may be an estimated usage level based on a type of the feature. In aspects, a value for the service priority level for each tenant may be assigned, with higher priority tenants (e.g., VIP or "white glove" tenants having thousands of users and special service agreements) being assigned a higher value and lower priority tenants (e.g., without special service agreements) being assigned a lower value. Alternatively, the monthly average users may be measured for each tenant. The measured value for monthly average users may be used, or an assigned value may be used (e.g., a value relative to total average monthly users of all tenants or the average monthly users of other tenants). The weighting of each parameter may be assigned based on how much the parameter may impact tenant sensitivity to distribution of a feature. In this way, a higher weight value may emphasize specific parameters more than others in assigning a rank for each tenant. In some cases, a parameter may even be ascribed a "negative" weight. In this case, if the parameter is present (i.e., the code distribution fixes a feature malfunction experienced by a tenant), this will lower the tenant ranking such that the tenant will receive the code distribution sooner.

Based on the assigned rankings, the tenant ranker 112 may generate a ranked tenant list 128. In some cases, the ranked tenant list 128 may be generated for each new or updated feature to determine how the code will be distributed to tenants. In other cases, the ranked tenant list 128 may be utilized for a period of time (e.g., 1 day, 5 days, 15 days, 30 days) to determine how the code for new or updated features will be distributed to tenants during the period of time. As should be appreciated, a tenant with a higher priority service level (e.g., having a service agreement guaranteeing a certain level and quality of service) may be ranked higher than tenants with a lower priority service level. This way, the tenant with a high priority in avoiding service disruptions may receive the code distribution after the set of program instruction is more stable after having gone through additional evaluation and testing. Similarly, a tenant with higher monthly average users may be ranked higher than other tenants with lower monthly average users so as to receive more stable code distributions. That is, tenants with less usage may correlate with less opportunity for experiencing service outages. Furthermore, the tenants with lower usage would be less likely to raise complaints if the feature malfunctions during early stages of code distribution, for example. Similarly, tenants with higher usage are less likely to raise complaints when the feature is more stable in later stages of distribution. In either case, customer dissatisfaction with the application services is reduced.

Code distributor 114 uses the ranked tenant list 128 and provides the set of program instructions to one or more virtual servers 142*a/b* and/or physical servers 144 associated with a select set of tenants. In aspects, the code distributor 114 may identify servers hosting particular tenants in order to distribute the program instructions based on the ranked tenant list 128. For a particular set of program instructions, code distributor 114 may iteratively distribute (e.g., enable) the same set of program instructions to different sets of tenants, which may be grouped in an order of ranking from low to high. There may be a first set of tenants (lower ranked), a second set of tenants (mid-ranked), and a third set of tenants (higher ranked), for example. The code distributor 114 distributes the set of program instructions to the first set of tenants, and then the second set of tenants. The code distributor may determine whether use of the distributed set of the program instruction by the first set of tenants is successful. If so, the code distributor 114 may distribute the set of program instructions to the second set of tenants. If not, the code distributor 114 may postpone distribution of the set of program instructions until developers can evaluate and update the set of program instructions.

In aspects, if distribution of the set of program instructions to the first set of tenants was not successful, the distributed set of program instruction may be updated by the developer 102. For example, in some cases, the feature associated with the set of program instructions may not have performed properly for the first set of tenants; in other cases, the first set of tenants may have been dissatisfied with the feature for other reasons (e.g., based on user preferences rather than code malfunctions). In either case, the set of program instructions may be updated to improve feature performance or user satisfaction with the feature. In some cases, an update to the set of program instructions may be developed based on analyzing telemetry data, for example. In this case, the code distributor 114 may discontinue the staged distribution of the set of program instructions and may subsequently continue phased distribution of the updated set of program instructions to the second set of tenants. Additionally, the updated set of program instructions may be distributed to the first set of tenants.

Telemetry data receiver 116 receives status information from servers in the server farm 146. The status information measures or describes how end users 104 of tenants interact with features of the application services. For instance, the telemetry data 170 may include logs related to how end users accessing the application services (e.g., click data, input queries and output results, success reports or error reports, etc.). In aspects, the telemetry data may update or be used in conjunction with the dynamic parameters stored in the server usage database 126. Additionally or alternatively, the telemetry data 170 may include error logs or exceptions associated with executing the program instructions for a feature. In aspects, the developer 102 may receive telemetry data 170 for analyzing performance of the program instructions. The developer 102 may update the program instructions to correct any issue before further distribution.

As should be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
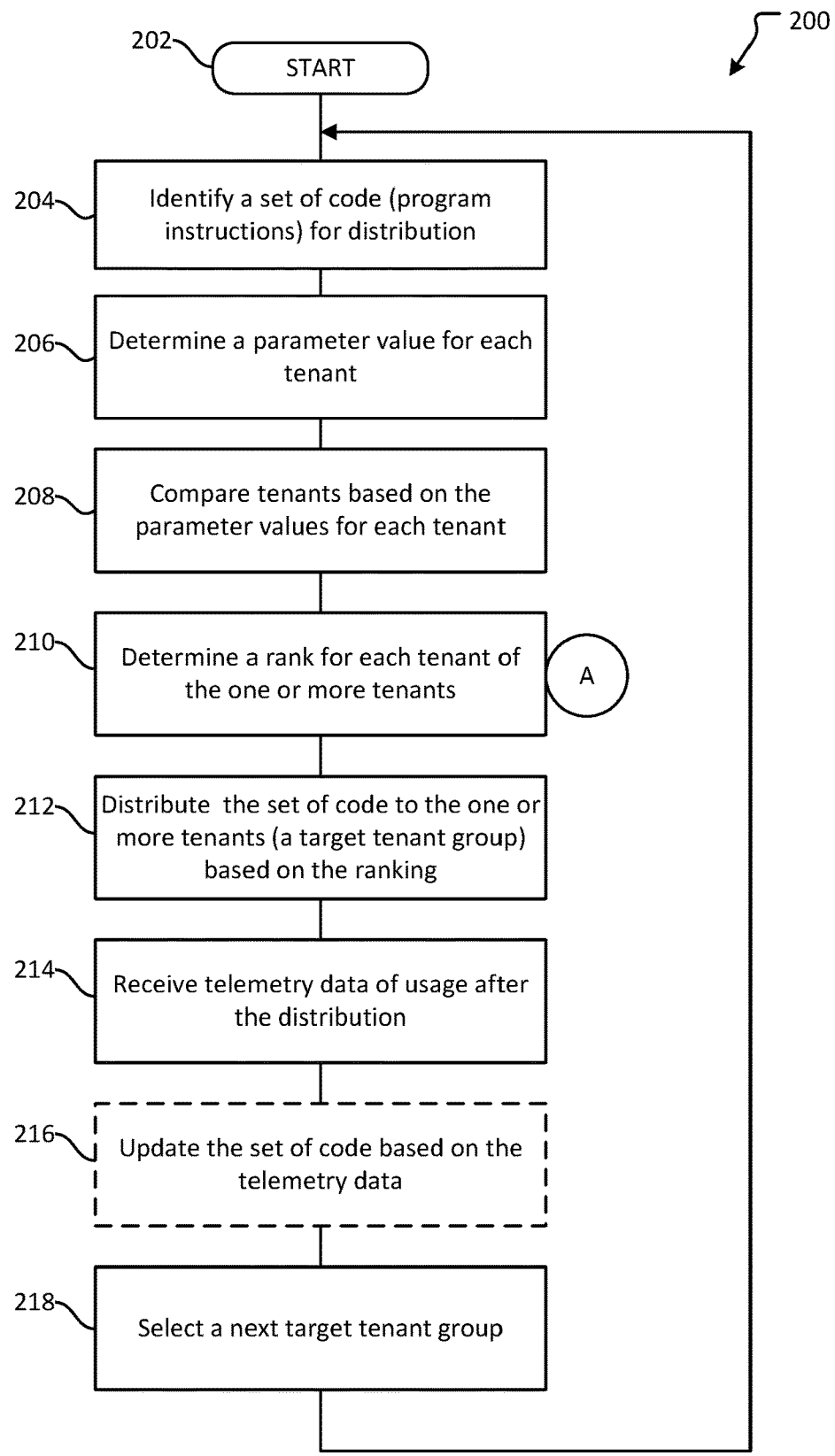
FIG. 2 illustrates an example method of distributing program instructions in accordance with aspects of the present disclosure.

FIG. 2 illustrates an example method of distributing program instructions in accordance with aspects of the present disclosure.

A general order of the operations for the method 200 is shown in FIG. 2. Generally, the method 200 starts with a start operation 202 and may recur after select operation 218. The method 200 may include more or fewer steps and/or may progress in a different order of steps than those shown in FIG. 2. The method 200 can be executed as a set of computer-executable instructions executed by a computer system and encoded or stored on a computer readable medium. Further, the method 200 can be performed by gates or circuits associated with a processor, an ASIC, an FPGA, a SOC or other hardware device. Hereinafter, the method 200 shall be explained with reference to the systems, components, devices, modules, software, data structures, data characteristic representations, signaling diagrams, methods, etc., described in conjunction with FIGS. 1, 3, 4A-B, 5A-C, 6, 7, and 8A-B.

At identify operation 204, a set of program instructions (i.e., or code) may be identified for distribution. By distributing the set of program instructions to tenants, features associated with the application services may be released, enhanced or replaced for access by end users. In aspects, the developers may provide the set of program instructions to the code storage 120. The code identifier 110 may identify the set of program instructions and cause the tenant ranker 112 to rank tenants to determine one or more tenants to which the code distributor 114 should distribute the set of program instructions. In aspects, the identify operation 204 may further identify a feature (or feature type) that the set of program instructions relates to. The set of program instructions may relate to a file upload feature (or operation) of the application service, for example. Another set of program instructions may relate to a file sharing feature (or operation). Feature types may include, but are not limited to, creating a new file, updating a file, sharing a file, simultaneous editing of a file, moving a file, renaming a file, publishing a file, removing a file, and un-publishing a file, for example. By identifying a feature type, ranking of tenants may be based on features of the application services for a more targeted distribution of the set of program instructions that prevents early distribution to tenants that actively use a feature or a specific feature type.

At determine operation 206, a parameter value for one or more parameters for each tenant among a plurality of tenants of the application services may be determined. In aspects, the one or more parameters and corresponding parameter values may be stored in at least one of tenant database 122 or server usage database 126.

At compare operation 208, tenants may be compared based at least on the parameter value for each of the one or more parameters for each tenant. In addition to a parameter value, each parameter may be associated with a weight value. In this way, different parameters may have varying significance when ranking tenants. For instance, a higher weighted parameter may impact a tenant ranking more than a lower weighted parameter. In comparing the tenants, the parameter value may be combined with the weight value for each of the one or more parameters for each tenant. Parameter weight table 124 may store the one or more parameters with corresponding weight values. Accordingly, each tenant may be associated with a "score" (or total tenant value) that represents a total of the parameter values (as modified by the corresponding weight values) for the one or more parameters. As should be appreciated, the score for each tenant may dynamically change based on the feature (or feature type) to be distributed and any changes to the parameter values of dynamic parameters.

At determine operation 210, ranks for tenants may be determined and assigned. Determining tenant ranks may be based on comparing a total tenant value (or score) representing the parameter values (as modified by the weight values) for one or more of the various parameters stored in tenant database 122, parameter weight table 124, and a server usage database 126. For instance, the tenant database 122 may provide various levels of service priority to respective tenants. The service priority levels may be predetermined for respective tenants by determining how sensitive a tenant may be to errors and/or interruptions in the application services. Additionally or alternatively, some tenants may contract for a certain guaranteed level of service by the software provider. The more sensitive the tenant is to interruptions in the application services, the higher the level of service priority for that tenant. These high priority tenants are ranked higher so that the distribution of the program instructions is delayed until the set of program instructions is stable after usage and testing by other tenants. In aspects, a set of program instructions may be deemed to be stable after several iterations of distributions, more than two, for example. In aspects, a number of tenants increases with each iteration of distributions. In other aspects, a total number of end users increases with each iteration of distributions. Updating the set of program instructions may take place after each iteration of the distributions. This way, issues in the program instructions may be discovered and corrected in earlier iterations when the overall load using the feature and/or computing resources is still low. The iterative distribution along with telemetry data collection ensures early detection and issue resolution. Thus, issues may be resolved before highly ranked tenants with more engaged use of features receive the distribution. In some aspects, the goal of the iterative distribution is to update the feature to 1% of low-ranked (e.g., low-usage) tenants first (e.g., generating 1% of the overall load on feature usage), rather than updating the feature to 1% of high-ranked (e.g., high-usage) tenants that may generate 10% of the overall load. In this way, issues can be discovered and corrected with a minimal impact on customer experience. In fact, due to low engagement with a new or updated feature, low-ranked tenants may not even notice an issue before it is resolved. In other aspects, some tenants may request a new or updated feature early in the iterative distributions. For such tenants, the level of service priority is set at a low level and the set of program instructions may be distributed to these tenants during an early iteration. By determining and assigning tenant rankings on a continuum of low to high, determine operation 210 further determines an order of distributing code to the tenants from low to high.

In aspects, determine operation 210 dynamically updates the determined ranks for tenants as values of the various parameters change over time during iterations of distributing the set of program instructions. Each iteration of distributing and testing the set of program instructions may be time-consuming. Regression testing may take place for more than 24 hours, for example. Some of the various parameters, a service priority level, an In-season status, CPU usage rate, support escalation rates, and feature-specific interests by a tenant, for example, may change while the regression testing takes place. A tenant that showed specific interest in a feature (e.g., high usage) may no longer be interested in the feature (e.g., low usage), for example. Such a tenant would have been ranked lower to receive a distribution of the set of program instructions earlier in the iterations, but these iterations may have passed. In this case, that tenant may be selected for distribution in the next iteration (whether or not the tenant would have been selected for that iteration based on an initial ranking). A grouping of tenants may be updated based on the updated ranking. By dynamically updating the tenant rankings, a subsequent iteration of the distribution may include any tenants that moved lower in ranking while the previous iteration took place.

In some aspects, levels of service priority used at the determine operation 210 may be based on a list of preferred (VIP) tenants or a white list of customers. Some tenants may be more sensitive to a service interruption than others. Tenants in specific industries such as those in finance and public services, for example, may be more sensitive to interruptions and losses of data due to impacts to their mission critical businesses. In some aspects, the list of preferred tenants may be weighted more heavily than values of statistical usage information. That is, preventing unwanted interruptions for preferred tenants may be a priority to the software provider.

In aspects, determine operation 210 may rank tenants with larger values of Monthly Average Users or MAU at a higher rank. Higher ranked tenants would receive distribution of the program instructions at least after a second iteration of the distribution. This way, a risk of service interruptions to the higher ranked tenants may be reduced. The server usage database 126 provides statistical usage information by tenants of servers and other distributed resources. The parameters may include MAU, which indicates an average number of end users for a tenant during a time period of a month. MAU may also indicate an average number of end users for a tenant using a specific feature or a feature type (e.g., file sharing, file uploads, for example) during a time period of a month. Additionally, the server usage database 126 may store a number of requests made per second (or RPS) by a tenant. End users of the tenant may make requests to the application services to search for and download files, for example. A number of requests made during a time period indicates how actively the tenant uses the application service.

Determine operation 210 may also use a value of RPS to assign a higher rank to a tenant with a higher value for RPS. This way, a tenant with more active usage may receive a distribution of code when the code is more stable. In some aspects, the server usage database 126 stores RPS for each feature (or feature type) of the application services. This way, the determine operation 210 may assign a different ranking to a tenant based on the particular feature (or feature type) associated with the set of program instructions for distribution. Additionally or alternatively, values of MAU and RPS may be stored in the tenant database 122 and/or the server usage database 126.

Determine operation 210 may also use weight values for modifying parameter values for the respective parameters. In aspects, the parameter weight table 124 provides weight values for respective parameters. Some parameters, a tenant service priority level, for example, may weigh more than other parameters, a CPU usage rate, for example. Weight values may be predetermined and manually set. Additionally or alternatively, the weight value may be automatically updated based on dependency conditions. The dependency conditions may be functions of the application services, MAU, or times of a day, a month, or a year for distributing the set of program instructions, for example. MAU of all tenants in the insurance industry across all servers (virtual or physical) may significantly increase after incidental situations (e.g., severe earthquakes, fires, or floods in multiple locations, for example). In this case, agents as end users of the respective insurance companies (e.g., tenant(s)) would need to update files, claim records, etc. This surge in usage may alter the tenant's MAU. Even so, MAU (an average value) may maintain a low weight value despite such a surge in usage, and the affected tenant(s) may still be ranked lower in the ranking, which would result in receiving code distribution in an earlier iteration during the surge in usage. In this case, the weight value may be automatically increased upon detection of such conditions for certain segments of tenants (here, tenants in the insurance segment).

At distribute operation 212, the set of program instructions (or code) may be distributed to the one or more tenants based on the ranking as assigned by the determine operation 206. For example, the distribute operation 212 may enable the set of program instructions on one or more virtual servers 142 for a first set of target tenants (e.g., Tenant A 106A). Once the code is distributed, the end users of the first set of target tenants may use the new or updated features associated with the application services. In some aspects, distribution operation 212 may pause before starting a subsequent distribution. The time period for the pause may be predetermined based on a number of iterations of distributing the set of program instructions. The pause between two distributions of the set of program instructions may determine a throttle (i.e., a rate) of distribution.

At receive operation 214, telemetry data associated with end user interactions with the feature encoded by the set of program instructions may be received from the server farm or farms on which the one or more target tenants reside. The telemetry data may include a log of executing the set of program instructions (or code). The telemetry data may be collected after the code distributor 114 distributes the set of program instructions to the server farm 146, for example. In aspects, the telemetry data may be analyzed to determine specific portions of the set of program instructions that caused issues when the set of program instructions was executed.

At update operation 216, the set of program instructions may be updated based on the telemetry data. Issues may be found in the form of errors (e.g., unpredictable performance, buffering or slow performance, failure to perform an operation, and the like) to end users as the program instructions are executed in the application services. Alternatively, the code may execute properly but users may be dissatisfied with the feature (e.g., multiple clicks required to perform the operation, notification of completion is red rather than green, and the like). In either case, sections of the set of program instructions may be updated by the developer 102 to resolve the issues found in the telemetry data (or other data such as user complaints). The updated set of instructions may then be identified for a subsequent distribution of the feature. Update operation 216 is optional. In aspects, the telemetry data may indicate no need to update the set of program instructions. Accordingly the set of program instructions may be unchanged for further distributions.

At select operation 218, a second set of target tenants for the next distribution of the set of program instructions may be selected. When the telemetry data indicates no need to update the set of program instruction, a wider group of tenants that are higher in ranking may be selected as the second set of target tenants to receive distribution. In other aspects, the telemetry data may indicate that the set of program instructions needs to be updated because of user dissatisfaction with the corresponding feature or errors in executing the feature. Once the set of program instructions has been updated, the updated set of program instructions may be distributed to the first set of target tenants that are lowest in ranking to restart the regression testing. Tenants at higher ranking may receive the distribution after earlier iterations are completed.

As should be appreciated, operations 202-218 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

Figure 3:
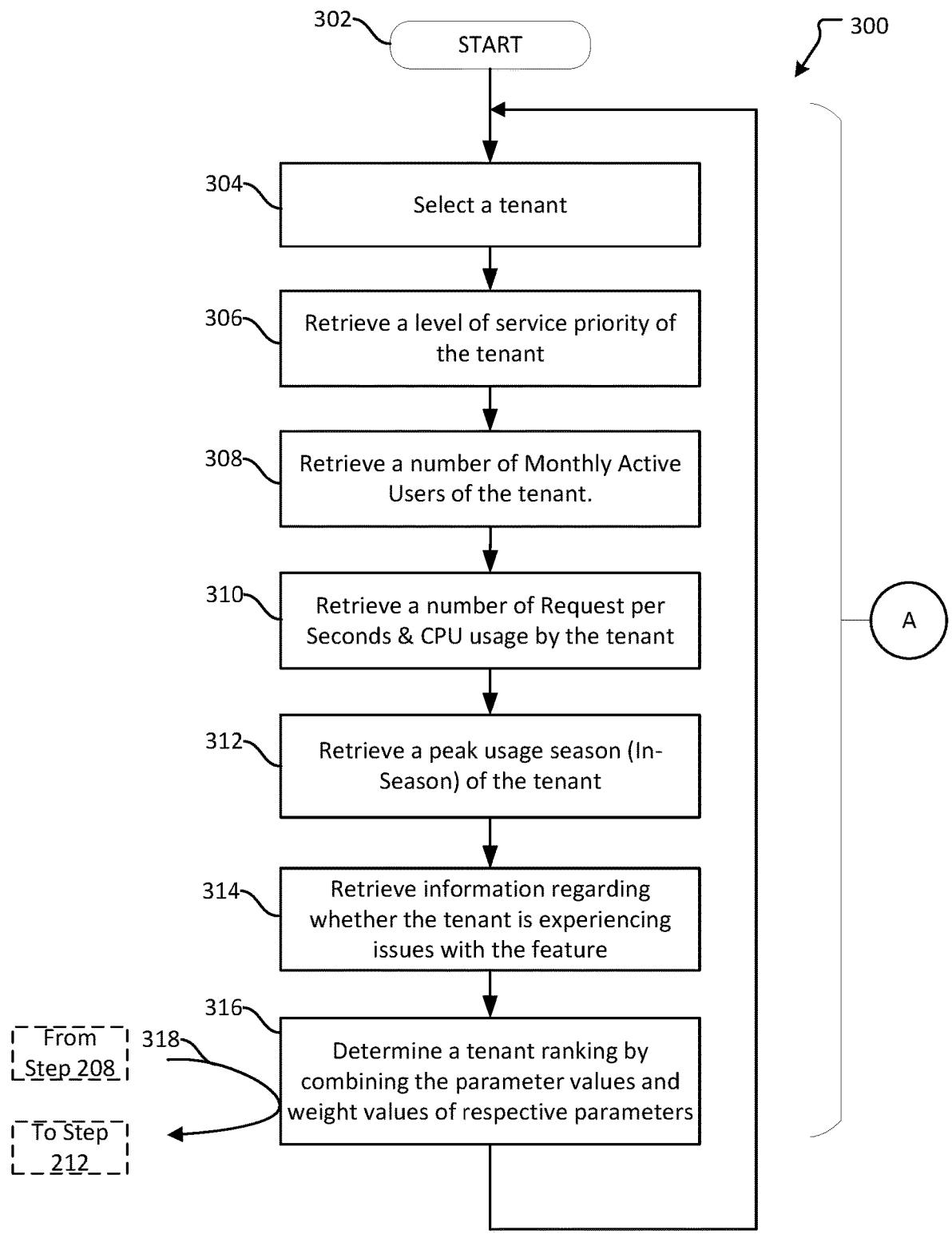
FIG. 3 illustrates an example method of ranking tenants for distributing program instructions in accordance with aspects of the present disclosure.

FIG. 3 illustrates an example method of assigning a rank to a tenant in accordance with aspects of the present disclosure.

A general order of the operations for the method 300 is shown in FIG. 3. Generally, the method 300 starts with a start operation 302 and ends with an end operation 318. The method 300 may include more or fewer steps or may arrange ordering of the steps differently than those shown in FIG. 3. The method 300 is directed to the method of assigning a rank to a tenant. The method 300 relates to the determine operation 210 in FIG. 2. In some aspects, the method 300 is recurring. The values of parameters and ranking of tenants may continue to be updated while tenants utilize the application services.

The method 300 can be executed as a set of computer-executable instructions executed by a computer system and encoded or stored on a computer readable medium. Further, the method 300 can be performed by gates or circuits associated with a processor, an ASIC, an FPGA, a SOC, or other hardware device. Hereinafter, the method 300 shall be explained with reference to the systems, component, devices, modules, software, data structures, data characteristic representations, signaling diagrams, methods, etc., described in conjunction with FIGS. 1, 2, 4A-B, 5A-C, 6, 7, and 8A-B.

At select operation 304, a tenant may be selected from the tenant database 122. In some aspects, the select operation 304 may select a tenant each time an indication to distribute program instructions for a feature is received. In other aspects, the select operation 304 may select a tenant when parameter values have changed since the last ranking of the tenant was assigned. The tenant database 122 may include an indicator for each tenant indicating whether any of parameter values have changed since a rank for the tenant was last assigned. In some aspects, the feature or a type of feature may be determined based on the identified set of program instruction for distribution.

At retrieve operation 306, a service priority level of the tenant may be retrieved from the tenant database 122. The service priority levels may be predetermined for respective tenants by determining how sensitive a tenant may be to feature malfunctions and/or service interruptions. The more sensitive the tenant is to interruptions of the application services, the higher the level of service priority assigned to the tenant. Higher priority tenants need to be ranked higher so that the distribution of the program instructions is delayed until the set of program instructions is more likely to be stable after usage and testing by other tenants.

At retrieve operation 308, a number of Monthly Active Users (MAU) of the tenant may be retrieved from the tenant database 122. In aspects, the higher the MAU of the tenant, the more stable the application services should be. Accordingly, program instructions should be distributed to the tenant only after the program instructions show stability in execution based on iterations of regression testing. In some aspects, MAU of the tenant may relate to the received feature or a feature type for which the rank of each tenant is determined.

At retrieve operation 310, a number of Requests per Seconds (RPS) and a CPU usage rate of the servers being used by the tenant may be retrieved. RPS and CPU usage rate indicate load levels of the server farm. High RPS and CPU usage rate are indicative of tenants that heavily use computing resources of the application services. Accordingly, these tenants may be ranked higher to prevent these tenants from receiving distributions until after multiple iterations of the distributions to minimize service interruptions. In some aspects, RPS and CPU usage rate of the tenant may relate to processing the received feature or a feature type for which the rank of each tenant is determined.

At retrieve operation 312, a value indicative of whether the tenant is currently in a peak usage season (in-season) may be retrieved from the tenant database 122. For instance, the value may be binary, "1" for in peak usage season and "0" for not in peak usage season. In aspects, information regarding any seasonality in usage for the tenant may be predetermined and set in the tenant database 122. For instance, a tenant in accounting services may have in-season periods during the months of January (e.g., a typical month for completing year-end financials), April (e.g., a typical month for completing first quarter financials), July (e.g., a typical month for completing second quarter financials), and so on. Additionally or alternatively, the month of March may be in-season due to tax filing preparations. When the time for distribution matches the in-season value (e.g., "1"), then the tenant may be determined to be in a peak usage season. In other aspects, the in-season value may be automatically set and updated by the system 100 based on server usage information for the tenant in the server usage database 126.

In some aspects, the value indicative of the in-season parameter may relate to the tenant using the received feature or a feature type for which the rank of each tenant is determined.

At retrieve operation 314, status information about the tenant may be retrieved from the tenant database 122. The status information may indicate whether the tenant is experiencing issues with the feature relating to the set of program instructions for distribution, for example. When a tenant is experiencing an issue with the feature associated with a code distribution, it is likely that the tenant wishes the issue to be resolved at the earliest possible time. Thus, regardless of tenant ranking, when the program instructions to be distributed are in response to a request by the tenant to resolve an issue (e.g., the set of program features encode a fix to the feature), the set of program instructions rectifying the issue will be distributed to the tenant at an earlier iteration. If this parameter is present, the tenant ranking may be over-ridden. Alternatively, this parameter may be associated with a "negative" weight value such that the ranking of the tenant is lowered so as to receive the code distribution at an earlier iteration. As a caveat, regardless of tenant ranking, when the program instructions to be distributed are in response to a request by the tenant to resolve an issue (e.g., the set of program features encode a fix to a feature), the set of program instructions rectifying the issue will be distributed to the tenant at an earlier iteration. RPS and the CPU usage rate values may be retrieved from the server usage database 126.

At determine operation 316, a rank of the tenant may be determined and assigned. In aspects, the rank is determined by combining the information on the respective parameters, as described above, along with applying weight values for the respective parameters. For example, the information on the level of service priority, MAU, RPS, CPU usage, the in-season information, and the status information about the tenant relating to the feature may be normalized. Normalized values of the respective parameters may be some value between 0 and 100, for example. The normalized values may then be multiplied by weight values of the respective parameters and the tenant may be assigned a score, for instance. A rank of the tenant may be assigned by comparing and sorting the resulting scores among the tenants.

In some aspects, determine operation 316 uses weighted values of the various parameters used for comparing and ranking tenants. The parameters used for comparison may include but are not limited to a service priority level for each tenant, monthly average users (MAU) for each tenant, and a CPU usage rate for each tenant, for example. Each parameter for comparison may have a distinct weight value to emphasize specific parameters more than others in assigning a ranking for each tenant. Based on the assigned rankings, the tenant ranker 112 generates a ranked tenant list 128. For instance, a tenant with a higher service priority level may be ranked higher than tenants with a lower service priority level. This way, the tenant with a high priority in avoiding service issues may be highly ranked and may receive the program instructions at a later iteration of the distributions. At later iterations of the distribution, the set of program instruction is more stable and more likely to satisfy customer expectations on design of the features after having gone through more regression testing. Similarly, a tenant with higher monthly average users (MAU) of the application services may be ranked higher than tenants with lower MAU in order to receive more stable code distributions. In contrast, tenants with less usage are less likely to experience service outages during earlier iterations of code distributions. Furthermore, tenants with less usage are less likely to raise complaints before receiving fixes to feature problems of the application services, for example. Similarly, tenants with higher usage are less likely to raise complaints because later iterations of distributions are likely to include fixes to any feature issues. In either case, service interruptions and customer dissatisfaction are reduced.

In aspects, determine operation 316 corresponds to determine operation 210 in FIG. 2. Thus, compare operation 208 progresses to determine operation 210 (or 316) directed to ranking each tenant. Determine operation 210 (or 316) progresses to distribute operation 212 in FIG. 2. In other aspects, determine operation 316 returns to select operation 304, where the method continues to select, evaluate, and rank tenants to dynamically rank the tenants based on changing conditions (e.g., tenant usage). The recurring steps of method 300 allow for dynamically updating or reassigning rankings to tenants.

As should be appreciated, operations 302-318 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figures 4A, 4B:
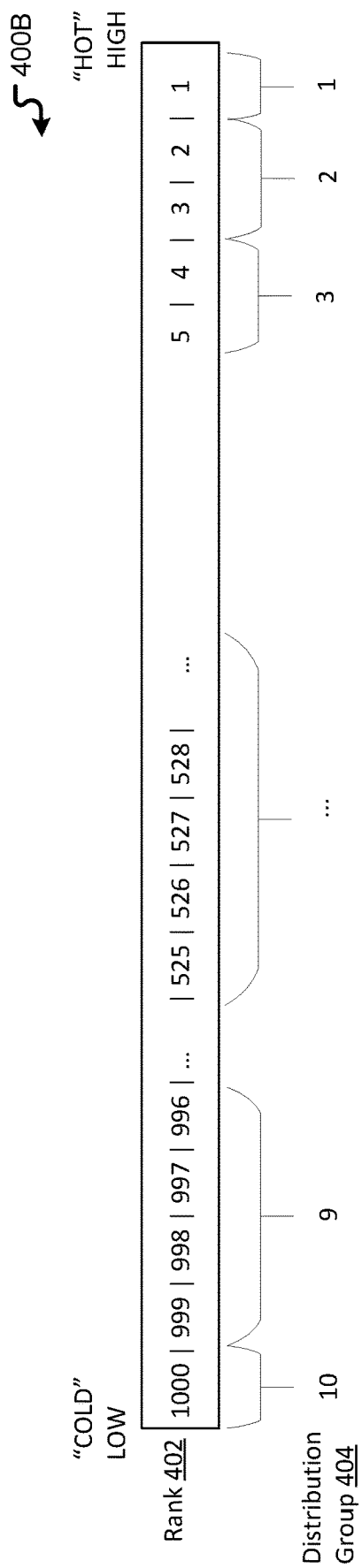
FIGS. 4A-4B illustrate examples of ranking tenants for distributing program instructions in accordance with aspects of the present disclosure.

FIGS. 4A-4B illustrate an example data structures of a tenant database and a schematic diagram of ranked tenants for distributing program instructions in accordance with aspects of the present disclosure.

FIG. 4A illustrates an example ranked tenant list (e.g., ranked tenant list 128). Each row of the ranked list 400A corresponds to a tenant. As illustrated, the table entries are sorted based on ranking of the tenants. Rank 402 column indicates a rank for each tenant. In aspects, there may be 1000 tenants, ranked from "1" being the highest to "1000" being the lowest. In some cases, tenants may be assigned to a group. There are ten groups of tenants as shown in the ranked tenant list. A rank value of 1 (one) depicts that the corresponding tenant is the highest in priority, thereby receiving a distribution of the set of program instructions (i.e., code) later in iterations. Group 404 column indicates a group identification of the tenants. Tenants with a same group identifier belong to the same group. For example, group #9 includes four tenants: "A1-Industry," "Health-Tech," "P School," and "CC College," for example. Group 1 includes a tenant "Critical-Research," which has the highest ranked tenant. Tenant ID 406 column indicates an identifier of a tenant. Tenant Name 408 column indicates a name of a tenant. Farm ID column 410 indicates an identifier of server farm (e.g., the server farm 146) that is allocated for a tenant. Farm ID of "0100" is allocated for a tenant with its name "Y Finance" with a tenant ID of "40", for example. Machine ID 412 column indicates an identifier of a server or a set of servers that is allocated to a tenant. Server ID of "0123" is allocated to the tenant "Y Finance" with the tenant ID of "40", for example.

In aspects, a rank of a tenant may be assigned based on a combination of one or more values of parameters, including a service priority level, MAU, RPS, a CPU usage rate, whether the tenant is in-season, and the like. The parameters are not limited to the above. In some cases, each parameter may carry a distinct weight value representing a significance of each parameter versus others in determining tenant rankings.

FIG. 4B illustrates a schematic diagram of ranked tenants for ordering the distribution of program instructions in accordance with aspects of the present disclosure. The horizontal bar 400B ranges from "COLD" (i.e., the lower ranking) to "HOT" (i.e., the higher ranking). The numbers inside the horizontal bar indicates a spectrum of Rank 402 of one thousand tenants, starting from the 1000th rank (the lowest) on the left to the 1st rank (the highest) on the right. Tenants with lower ranks are "COLD" (e.g., due to less usage of application services by the tenants). Less activity by tenants translates into less risk of being impacted by possible errors caused by a distribution of program instructions. In contrast, tenants at higher ranks are "HOT" (e.g., due to higher activity of the application services or higher sensitivity to errors caused by distribution of the set of program instructions). As illustrated by brackets next to Group 404, a tenant with rank value of "1" has a group ID of "1," tenants with rank values of "2" and "3" have a group ID of "2," and so on. As distributions of the set of program instructions takes place from low-risk tenants to high-risk tenants, the tenant with the group ID of "10" (lowest rank) receives the distribution of the set of program instruction first. The tenants with the group ID of "1" (highest rank), receive the distribution during a last iteration of the distribution.

FIGS. 5A-C illustrate examples of data structures used for distributing a set of program instructions according to an example system in accordance with aspects of the present disclosure.

FIG. 5A illustrates an example tenant table in the tenant database (e.g., the tenant database 122) according to an example system in accordance with aspects of the present disclosure. The tenant table 500A includes tenant ID 502 column, tenant name 504 column, farm ID 506 column, server ID 508 column, priority 510 column, MAU 512 column, RPS 514 column, and In-Season 516 column. Each row of the table corresponds to a different tenant.

For instance, tenant ID 502 indicates an identifier (e.g., 03) of a tenant. The tenant name 504 indicates a name (e.g., "P School") of the tenant. Farm ID 506 indicates an identifier (e.g., "6500") of a server farm being allocated to the tenant. Server ID 508 indicates an identifier (e.g., "6532") of a server being allocated to the tenant. The server may be a virtual server or a physical server, depending on a resource allocation of the server farm. Priority 510 indicates a level (e.g., "1") of service priority for the tenant. A higher level may indicate a higher priority of service provided to the tenant. MAU 512 indicates a number (e.g., "110") of Monthly Active Users by the tenant. A tenant with a larger MAU indicates more usage of the application services. RPS 514 indicates a number (e.g., "180") of requests per second made by end users of the tenants. A tenant with a larger RPS indicates more frequent use of the application services. In-Season 516 indicates whether the tenant is currently in a high season with high usage by end users (e.g., "Yes" or "1") or in a low season with low usage by end users (e.g., "No" or "0").

FIG. 5B illustrates an example data structure of weight values for various parameters (e.g., the parameter weight table 124) according to an example system in accordance with aspects of the present disclosure. In aspects, the weighted parameter table 500B includes Parameter ID 522 column, weight value 524 column, and parameter name 526 column.

Parameter ID 522 indicates an identifier (e.g., "1") of a parameter. Weight value 524 indicates a value (e.g., "1") of a weight being used to apply a significance of the parameter in assigning a rank to a tenant. In aspects, a parameter with a higher weight value indicates that the parameter is more influential in ranking a tenant than other parameters with lower weight values. Parameter name 526 indicates a name (e.g., "tenant service priority level") of a parameter. In aspects, the parameters in the weighted parameter table 500B may correspond to the parameters as described for retrieval in operations 306-316 in FIG. 3.

The following describes examples of how values of parameters and weight values may be combined to assign a rank to a tenant. A tenant "Y Finance" is ranked the lowest in the ranked list 400A, for example, in FIG. 4A. As described in the tenant table 500A in FIG. 5A, a level of service priority of the tenant "Y Finance" is low ("1"), both MAU and RPS are low at 8 and 1 respectively. The tenant is not In-session. Alternatively, a tenant "247 Security" is ranked higher at 9th in the ranked list 400A, for example. As described in the tenant table 500A in FIG. 5A, the tenant "247 Security" is not In-session. However, its service priority level is the highest at 10. The value of a service priority level is weighed heavily in combining the values to assign the rank. Indeed, the weight value of tenant service priority level is the highest in the weight table 500B in FIG. 5B.

FIG. 5C illustrates an example data structure of scheduling distributions of a set of program instructions according to an example system in accordance with aspects of the present disclosure. The example schedule table 500C includes distribution ID 530 column, code ID 532 column, tenant group ID 534 column, start time 536 column, and pause duration 538 column. Each row of the table may correspond to an occurrence of distribution of a set of program instructions.

Distribution ID 530 indicates an identifier (e.g., "1") of a stage of distribution. Code ID 532 indicates an identifier (e.g., "1") of a set of program instructions. The set of program instructions may be stored in the code storage 120. Tenant group ID 534 indicates an identifier (e.g., "1") of a tenant group. The tenant group ID 534 may correspond to a value of Group 404 in the ranked list 400A. Start time 536 indicates a time (e.g., "20200410 0200" (i.e. at 2 am on Apr. 10, 2020) of starting the first stage of distribution for the set of program instructions with a code ID of "1." Pause duration 538 indicates a pause or a time period (e.g., 120 minutes) taking place between a completion time of the current distribution and a starting time of a next distribution. In aspects, counting the pause duration corresponds to use of a timer 610 in FIG. 6. During the pause period after a distribution, end users may use the server application with the distributed set of program instructions.

Thus, the example schedule table 500C includes schedules of three distributions of program instructions with distribution IDs 1, 2, and 3. A first distribution enables a set of program instructions with code ID=1 to a tenant(s) in tenant group ID=10, starting at 2 am on Apr. 10, 2020, and pauses for 120 minutes after the distribution. A second distribution enables the same set of program instructions with code ID=1 to tenants in tenant group ID=9, starting at 3 am on Apr. 11, 2020, with a pause duration of 240 minutes. A third distribution uses a set of program instructions with a code ID=2 to tenant(s) in tenant group ID=10, starting at 2 am on April 12, with a pause duration of 480 minutes. In aspects, a longer pause period of 480 minutes is scheduled for the third distribution because the code ID=2 corresponds to a set of updated program instructions, which would resolve issues found based on distribution ID=2 using the code ID=1.

As should be appreciated, the various methods, devices, applications, features, etc., described with respect to FIGS. 5A-C are not intended to limit the data structures 5A-C to being performed by the particular applications and features described. Accordingly, additional controller configurations may be used to practice the methods and systems herein and/or features and applications described may be excluded without departing from the methods and systems disclosed herein.

Figure 6:
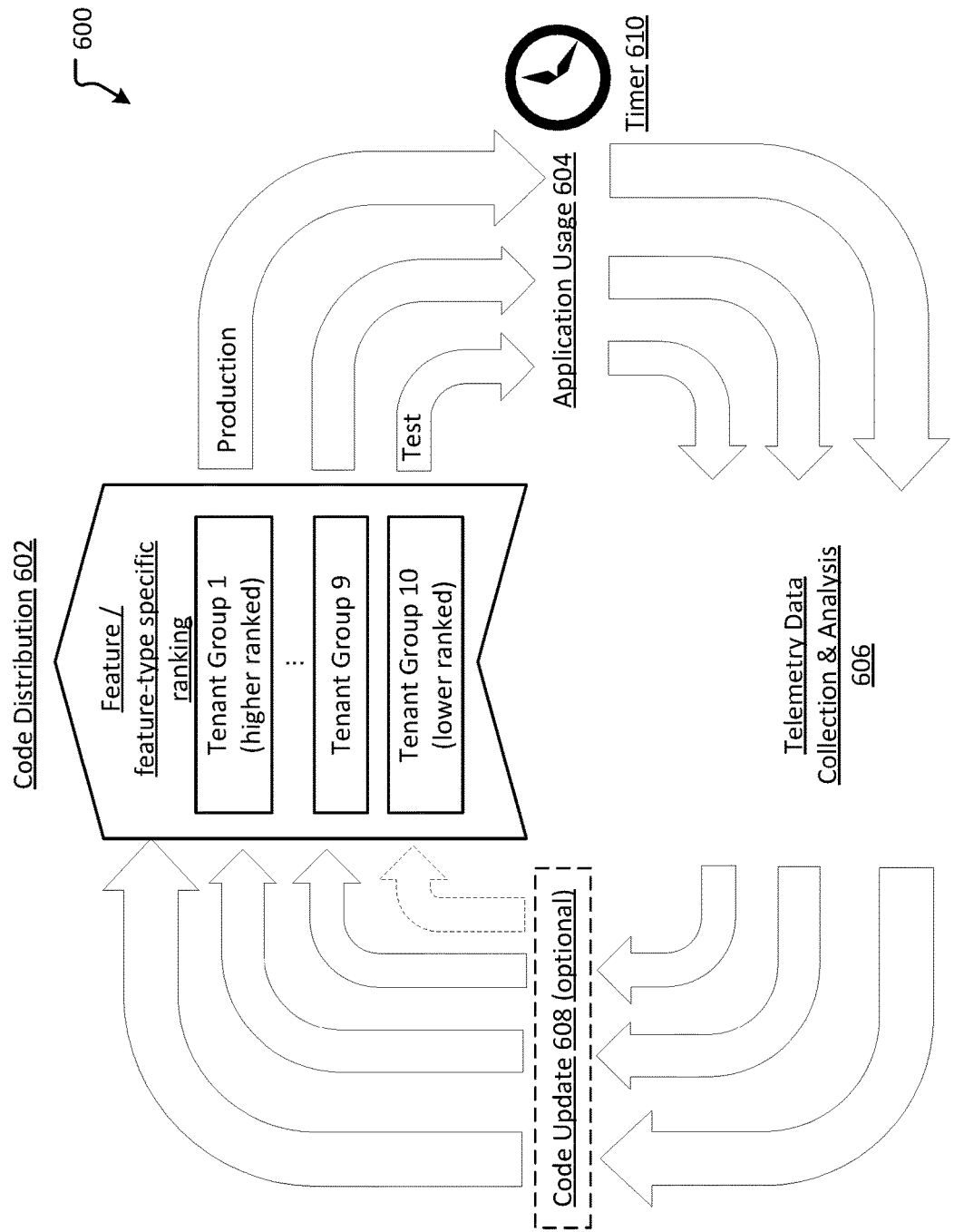
FIG. 6 illustrates an example distribution system according to an example system with which the disclosure may be practiced in accordance with aspects of the present disclosure.

FIG. 6 illustrates a schematic example of distributing a set of program instructions according to an example process 600 in accordance with aspects of the present disclosure. In some aspects, the process 600 processes code distributions to three distinct groups of tenants: tenant group 10, tenant group 9, and then finally tenant group 1 in sequence. The groups may be based on feature specific (or feature-type) specific rankings of tenants. The process 600 illustrates multiple iterations (or stages) of code distributions. In aspects, the tenant group 10 corresponds to tenant ID 40 with Group ID value of 10 in FIG. 4A. The tenant group 9 corresponds to the tenants with Group ID value of 9. The tenant group 8 corresponds to the tenants with Group ID value of 8 in FIG. 4A. In aspects, the tenant group is based on ranking of tenants that relates to a feature or a feature type of the application services being updated. Tenants in the tenant group 10 are the least actively using the feature of the total tenants, for example. In contrast, those tenants in the tenant group 1 are the most active in using the feature (or the feature-type) of the application services. The tenants in the tenant group 9 may receive updates to the set of program instructions after two iterations of distributing the set of product instructions. In some other aspects, the ranking and the grouping of tenants may be based on the various parameters across all features of the application services.

At code distribution operation 602 during its first iteration, a set of program instructions (i.e., code) may be distributed to a tenant group. As schematically illustrating three groups of tenants, the set of program instructions may be first distributed to tenants in a tenant group 10. After the distribution, end users in the tenant group 10 may use the feature associated with the distributed program instructions. Timer 610 indicates that the application usage 604 continues for a predetermined time period. While the application usage 604 takes place, telemetry data may be collected. The telemetry data may include a log of requests and responses made between end users and the application service in the servers for the tenants. The log may include information about an occurrence of errors.

When the predetermined time measure by timer 610 elapses, the telemetry data analysis 606 may take place. In aspects, the telemetry data may be analyzed to identify issues in the distributed set of program instructions. Results from the analysis of the telemetry data may be provided to developers.

At code update operation 608, the developers may update the set of program instructions. The updated set of program instructions may resolve the issues as identified by analyzing the telemetry data. In some aspects, the code update operation 608 is optional.

At the code distribution operation 602 during the second iteration, the (updated) set of program instructions is distributed to a combination of the tenant group 1 and the tenant group 2. This way, each iteration of the code distribution covers an increasing number of tenants. Similar to the operations during the first iteration, the end users of the tenants of groups 1 and 2 who receive the updated set of program instructions use the service application (i.e. application usage 604). Telemetry data is collected and analyzed (606). And, at the code update operation 608, the set of program instructions may be updated. During the third iteration, a combination of the tenant groups 1, 2, and 3 receive distribution of the program instructions. In aspects, each iteration of distribution and use of the set of program instruction constitutes a "ring" or an iteration. Thus there are three "rings" as illustrated in FIG. 6.

In aspects, the service applications continue its operations and end users of the tenants continue to use the service applications by accessing the servers in the cloud. Accordingly, statistical information in the tenant database (e.g., the tenant database 122) and the server usage database (e.g., the server usage database 126) may be dynamically updated. Thus, ranking of tenants may be continuously updated. Groupings of tenants for receiving new and/or updated features of the service applications may dynamically change. Iterations of the distribution increases coverage of tenants cumulatively. This way, tenants are not to be inadvertently missed as rankings of the tenants dynamically change as iterations of distributions take place.

As should be appreciated, the various methods, devices, applications, features, etc., described with respect to FIG. 6 is not intended to limit the process 600 to being performed by the particular applications and features described. Accordingly, additional controller configurations may be used to practice the methods and systems herein and/or features and applications described may be excluded without departing from the methods and systems disclosed herein.

Figure 7:
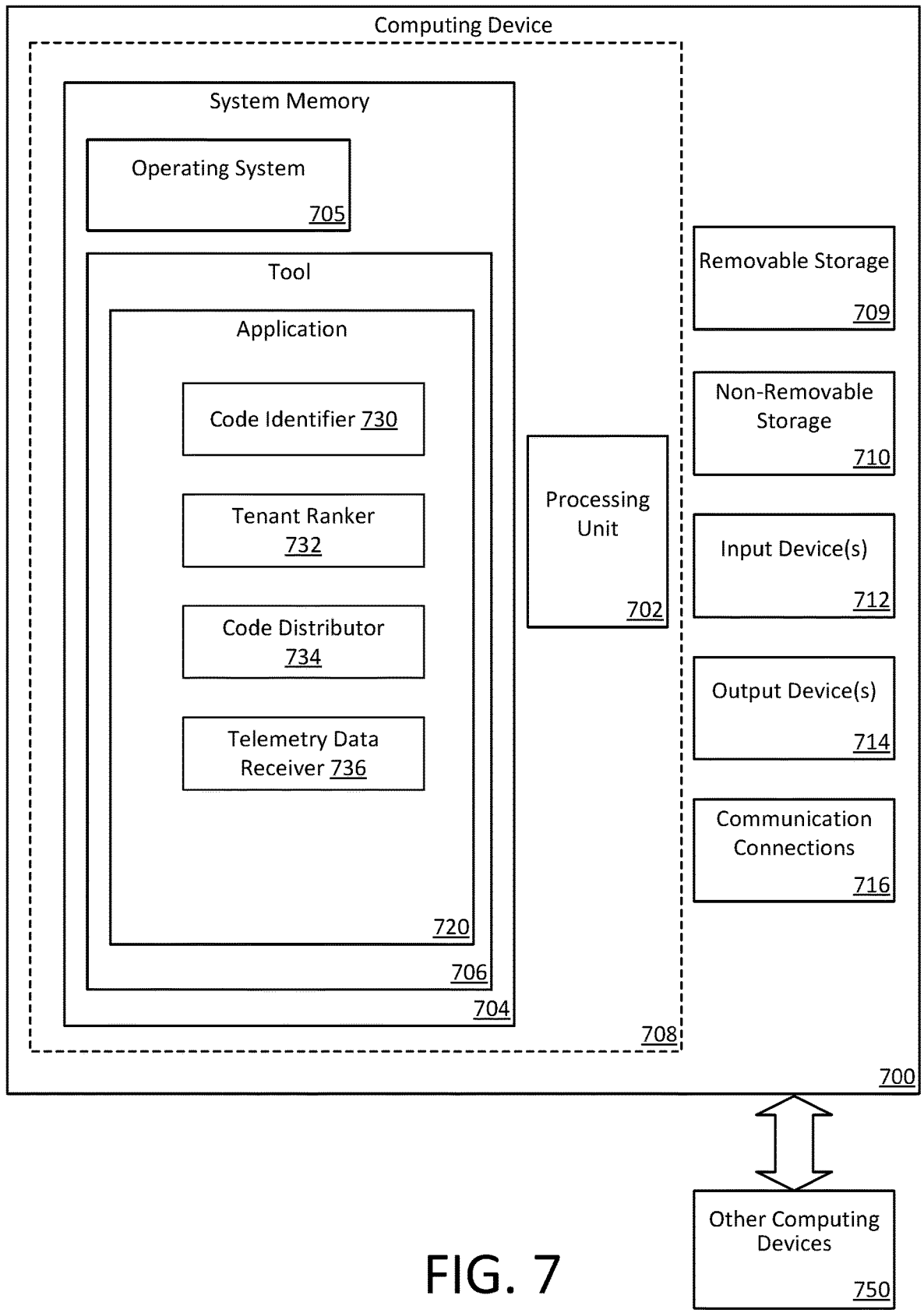
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program tools 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program tools and data files may be stored in the system memory 704. While executing on the processing unit 702, the program tools 706 (e.g., code distribution application 720) may perform processes including, but not limited to, the aspects, as described herein. The code distribution application 720 includes a code identifier 730, a tenant ranker 732, a code distributor 734, and a telemetry data receiver 736, as described in more detail with regard to FIG. 1. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 700 may also have one or more input device(s) 712, such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of communication connections 716 include, but are not limited to, radio frequency (RF) transmitter, receiver, and/or transceiver circuitry; universal serial bus (USB), parallel, and/or serial ports.

The term computer readable media as used herein may include computer storage media (or a plurality of a computer storage medium). Computer storage media may include volatile and nonvolatile, removable and non-removable media implemented in any method or technology for storage of information, such as computer readable instructions, data structures, or program tools. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
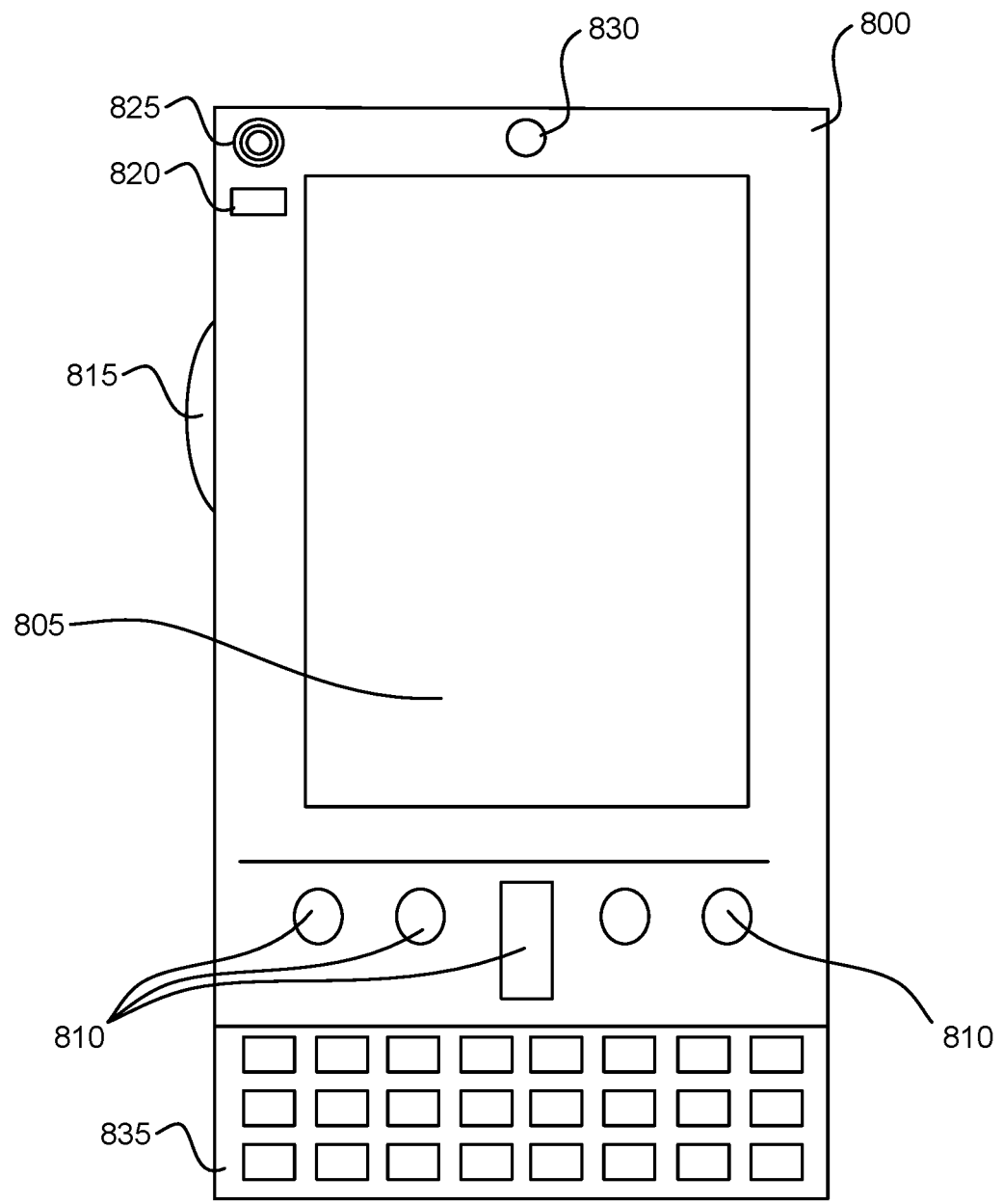
FIG. 8A is a simplified diagram of a mobile computing device with which aspects of the present disclosure may be practiced.
Figure 8B:
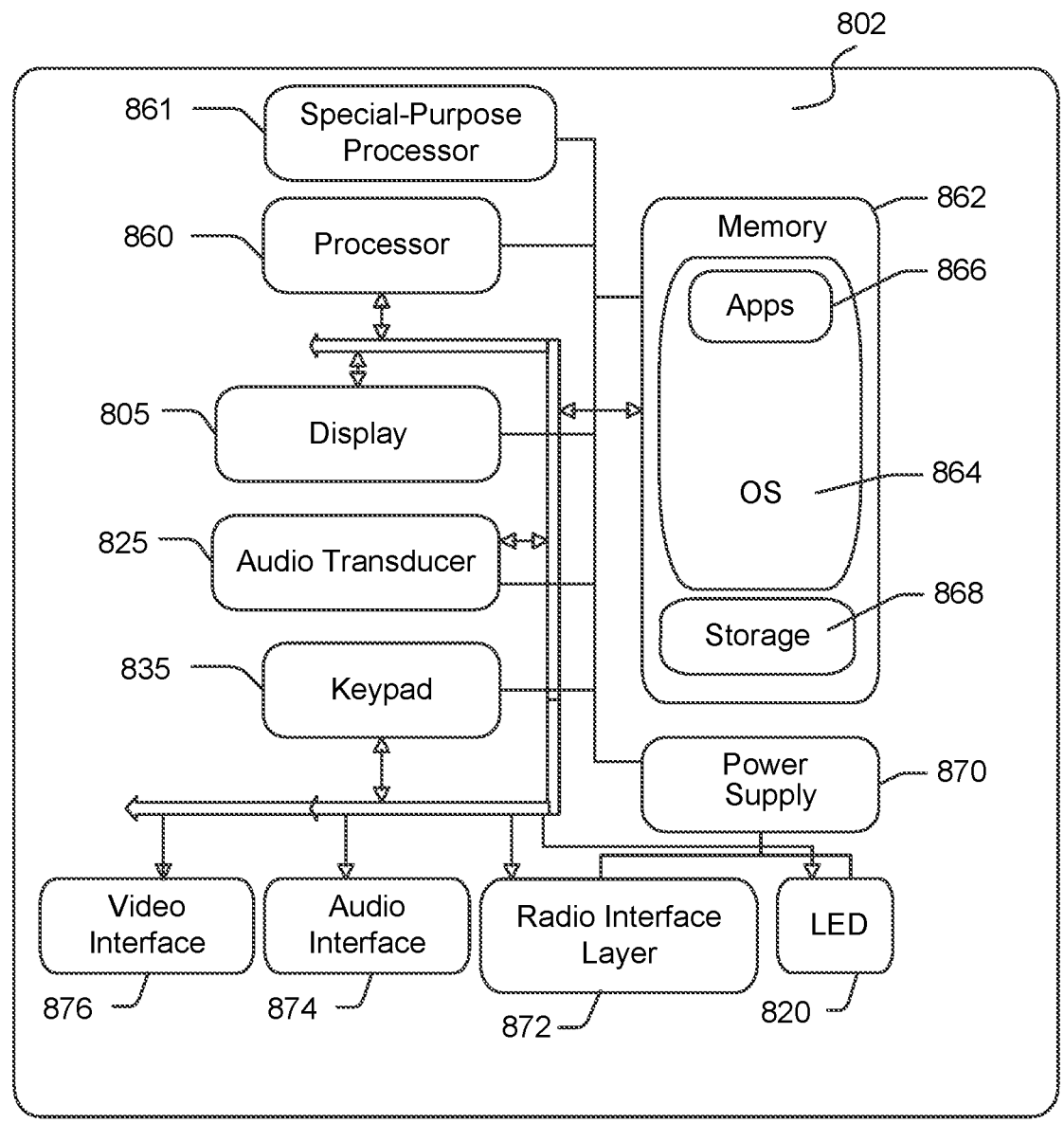
FIG. 8B is another simplified block diagram of a mobile computing device with which aspects of the present disclosure may be practiced.

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. In some aspects, the client (e.g., computing devices of end users 104 in FIG. 1) may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of computing device, a server (e.g., a virtual server 142a or a physical server 144), a mobile computing device, etc. That is, the computing device 800 can incorporate a system (e.g., an architecture) 802 to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated digital assistant (PDA) and wireless phone.

One or more application programs 866 may be loaded into the memory 862 and run on or in association with the operating system 864. Examples of the application programs include phone dialer programs, e-mail programs, information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated configuration, the visual indicator 820 is a light emitting diode (LED) and the audio transducer (not shown) is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer (not shown), the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

In aspects, a computer-implemented method of distributing program instructions is provided. The method includes identifying a set of program instructions for distribution, where the set of program instructions is associated with a feature. The method further includes determining a parameter value of at least one parameter for each tenant of a plurality of tenants associated with a cloud computing environment and comparing the plurality of tenants based on the parameter value of the at least one parameter for each tenant. Based on the comparison, the method includes assigning a rank to each tenant of the plurality of tenants, where at least a first tenant is assigned a lower rank than at least a second tenant. Based on the assigned rank, the method includes distributing the set of program instructions to at least the first tenant and receiving telemetry data regarding execution of the set of program instructions by at least the first tenant. Based on the telemetry data, the method includes updating the set of program instructions and distributing the updated set of program instructions to at least the second tenant.

In another aspect, a system is provided. The system includes at least one processor and at least one memory storing computer-executable instructions that when executed by the at least one processor cause the system to perform operations. The operations include identifying a set of program instructions for distribution, where the set of program instructions is associated with a feature. The operations further include determining a parameter value for at least one parameter for each tenant of a plurality of tenants associated with a cloud computing environment and applying a weight value to the parameter value for the at least one parameter for each tenant of the plurality of tenants. Additionally, the operations include combining the parameter value and the weight value to form a combined value for the at least one parameter for each tenant and comparing the plurality of tenants based on the combined value for the at least one parameter for each tenant. Based on the comparison, the operations include assigning a ranking to each tenant of the plurality of tenants, where at least a first tenant is assigned a lower ranking than at least a second tenant. Based on the assigned ranking, the operations further include distributing the set of program instructions to at least the first tenant.

In yet another aspect, a computer storage medium is provided. The computer storage medium stores computer-executable instructions that when executed by a processor cause a computer system to perform operations. The operations include identifying a set of program instructions for distribution, where the set of program instructions is associated with a feature. The operations further include determining a parameter value for at least one parameter for each tenant of a plurality of tenants associated with a cloud computing environment and applying a weight value to the parameter value for the at least one parameter for each tenant of the plurality of tenants. Additionally, the operations include combining the parameter value and the weight value to form a combined value for the at least one parameter for each tenant and comparing the plurality of tenants based on the combined value for the at least one parameter for each tenant. Based on the comparison, the operations include assigning a rank to each tenant of the plurality of tenants, where at least a first tenant is assigned a lower rank than at least a second tenant. Based on the assigned rank, the operations further include distributing the set of program instructions to at least the first tenant.

Any of the one or more above aspects in combination with any other of the one or more aspect. Any of the one or more aspects as described herein.

What is claimed is:

1. A computer-implemented method of distributing program instructions, the method comprising:
    identifying a set of program instructions for distribution, wherein the set of program instructions is associated with a feature;
    determining a parameter value of at least one parameter for each tenant of a plurality of tenants associated with a cloud computing environment;
    comparing the plurality of tenants based on the parameter value of the at least one parameter for each tenant;
    based on the comparison, assigning a rank to each tenant of the plurality of tenants, wherein at least a first tenant is assigned a lower rank than at least a second tenant;
    based on the assigned rank, distributing the set of program instructions to at least the first tenant;
    receiving telemetry data regarding execution of the set of program instructions by at least the first tenant;
    based on the telemetry data, updating the set of program instructions; and
    distributing the updated set of program instructions to at least the second tenant.

2. The computer-implemented method of claim 1, wherein the at least one parameter comprises at least one of:
    a number of active users over a period of time;
    a number of requests for the feature over the period of time;
    a service priority level;
    a peak usage period falling within the period of time or outside of the period of time; or
    a number of reported issues.

3. The computer-implemented method of claim 1, further comprising:
    determining that the set of programing instructions addresses an issue experienced by the second tenant; and
    regardless of the assigned rank for the second tenant, distributing the set of programing instructions to the second tenant.

4. The computer-implemented method of claim 1, wherein the at least one parameter is associated with a weight value, and wherein assigning the rank further comprises:
  combining the parameter value and the weight value to form a combined value for the at least one parameter for each tenant;
  comparing the plurality of tenants based the combined value for the at least one parameter for each tenant; and
  based on the comparison, assigning the rank to each tenant of the plurality of tenants.

5. The computer-implemented method of claim 1, the method further comprising:
  determining a usage level for the feature provided by the set of program instructions for each tenant of the plurality of tenants.

6. The computer-implemented method of claim 5, wherein the usage level is an estimated usage level based on a type of the feature.

7. The computer-implemented method of claim 5, wherein the usage level is indicative of a level of impact associated with distributing the set of program instructions to each tenant.

8. The computer-implemented method of claim 1, the method further comprising:
  in a first stage, distributing the set of program instructions internally to a set of users associated with a software provider;
  in a second stage, distributing the set of program instructions to at least the first tenant based on the lower rank; and
  in a third stage, distributing the updated set of program instructions to at least the second tenant.

9. The computer-implemented method of claim 1, the method further comprising:
  updating the parameter value for the at least one parameter for each tenant of the plurality of tenants;
  comparing the plurality of tenants based on the updated parameter value for the at least one parameter for each tenant;
  based on the comparison, reassigning a rank to each tenant of the plurality of tenants; and
  based on the reassigned rank, distributing the set of program instructions to at least the second tenant.

10. The computer-implemented method of claim 2, wherein the at least one parameter comprises at least one of:
  a usage level of a Central Processing Unit (CPU) over the period of time; and
  a number of issue escalations over the period of time.

11. The computer-implemented method of claim 3, the method further comprising:
  notifying the first tenant prior to distributing the set of program instructions.

12. The computer-implemented method of claim 1, wherein a first parameter value for the at least one parameter for the first tenant is less than a second parameter value for the at least one parameter for the second tenant.

13. A system, comprising:
  at least one processor; and
  at least one memory storing computer-executable instructions that when executed by the at least one processor cause the system to:
    identify a set of program instructions for distribution, wherein the set of program instructions is associated with a feature;
    determine a parameter value for at least one parameter for each tenant of a plurality of tenants associated with a cloud computing environment;
    apply a weight value to the parameter value for the at least one parameter for each tenant of the plurality of tenants;
    combine the parameter value and the weight value to form a combined value for the at least one parameter for each tenant;
    compare the plurality of tenants based on the combined value for the at least one parameter for each tenant;
    based on the comparison, assign a ranking to each tenant of the plurality of tenants, wherein at least a first tenant is assigned a lower ranking than at least a second tenant; and
    based on the assigned ranking, distribute the set of program instructions to at least the first tenant.

14. The system of claim 13, the computer-executable instructions when executed further causing the system to:
  receive telemetry data regarding execution of the set of program instructions by at least the first tenant;
  based on the telemetry data, update the set of program instructions; and
  distribute the updated set of program instructions to at least the second tenant.

15. The system of claim 13, wherein the at least one parameter comprises at least one of:
  a number of active users over a period of time;
  a number of requests for the feature over the period of time;
  a service priority level;
  a peak usage period falling within the period of time or outside of the period of time; or
  a number of reported issues.

16. The system of claim 13, the computer-executable instructions when executed further causing the system to:
  determine that the set of programing instructions addresses an issue with the feature experienced by the second tenant; and
  regardless of the assigned ranking for the second tenant, distribute the set of programing instructions to the second tenant.

17. The system of claim 13, the computer-executable instructions when executed further causing the system to:
  notify the first tenant prior to distributing the set of program instructions.

18. A computer storage medium storing computer-executable instructions that when executed by a processor cause a computer system to:
  identify a set of program instructions for distribution, wherein the set of program instructions is associated with a feature;
  determine a parameter value for at least one parameter for each tenant of a plurality of tenants associated with a cloud computing environment;
  apply a weight value to the parameter value for the at least one parameter for each tenant of the plurality of tenants;
  combine the parameter value and the weight value to form a combined value for the at least one parameter for each tenant;
  compare the plurality of tenants based on the combined value for the at least one parameter for each tenant;
  based on the comparison, assign a rank to each tenant of the plurality of tenants, wherein at least a first tenant is assigned a lower rank than at least a second tenant; and based on the assigned rank, distribute the set of program instructions to at least the first tenant.

19. The computer storage medium of claim 18, the computer-executable instructions when executed further causing the computer system to:
- in a first stage, distribute the set of program instructions internally to a set of users associated with a software provider;
- in a second stage, distribute the set of program instructions to at least the first tenant based on the lower rank; and
- in a third stage, distribute the updated set of program instructions to at least the second tenant.

20. The computer storage medium of claim 18, the computer-executable instructions when executed further causing the computer system to:
- update the parameter value for the at least one parameter for each tenant of the plurality of tenants;
- combine the updated parameter value and the weight value to form an updated combined value for the at least one parameter for each tenant;
- compare the plurality of tenants based on the updated combined value for the at least one parameter for each tenant;
- based on the comparison, reassign a rank to each tenant of the plurality of tenants; and
- based on the reassigned rank, distribute the set of program instructions to at least the second tenant.

\* \* \* \* \*